United States Patent [19]

Adams et al.

[11] 3,737,239

[45] June 5, 1973

[54] MACHINE COLOR RECOGNITION

[75] Inventors: Jim Mills Adams, West Caldwell; William Charles Grimmell, Lake Hiawatha, both of N.J.

[73] Assignee: Hoffmann-La Roche Inc., Nutley, N.J.

[22] Filed: July 16, 1971

[21] Appl. No.: 163,306

[52] U.S. Cl. ................356/177, 356/186, 356/191, 250/226, 209/111.6
[51] Int. Cl. ................................................G01j 3/46
[58] Field of Search......................356/191, 178, 186, 356/195; 250/226; 209/111.6

[56] References Cited

UNITED STATES PATENTS 3,069,013   12/1962   Neubrech et al. ....................356/178
3,497,304   2/1970    Berube ..................................356/178
3,582,664   6/1971    Hrdina .................................250/226

Primary Examiner—Ronald L. Wibert
Assistant Examiner—R. J. Webster
Attorney—Samuel L. Welt, Jon S. Saxe, Bernard S. Leon et al.

[57] ABSTRACT

Automatic cross-correlation specimen monitoring apparatus and method for identifying spectral reflectance characteristics of a specimen relative to a standard comprising: sensing reflectance values of the specimen at each of two or more overlapping bandwidths covering the spectrum, generating electrical output signals indicative of the reflectance values, modifying the signals with standard reference values one for each of the bandwidths, relating the modified and unmodified signals to generate a cross-correlation coefficient between the specimen reflectance values and the standard reference values, and comparing the cross-correlation coefficient with a preset value representative of a minimum deviation from the standard to quantitatively determine the similarity in spectral reflectance between the specimen and the standard.

16 Claims, 3 Drawing Figures

MACHINE COLOR RECOGNITION

BACKGROUND OF THE INVENTION

1. Field of the Invention

The present invention relates to automatic specimen identification equipment and more particularly to an improved method and apparatus for automatically analyzing the diffuse spectral reflectance of a specimen to determine whether the spectral characteristics of a specimen are sufficiently close to a standard.

2. Description of the Prior Art

In high speed processing, automated monitoring systems have become an indispensable tool in examining the flow of material to ascertain any irregularities. In such monitoring systems, color has become one of the criterion for such examination purposes. Color differentiation is especially useful in the pharmaceutical field where great care has been taken to clearly delineate between various products for obvious reasons of safety. Other industries which utilize color as a vehicle for detecting flaws, irregularities etc., include the paint and dye industries, the textile industry, the food processing industry, the cosmetic industry etc.

In a process where discrete color differences indicate an error, e.g. the presence of an incorrect dosage form in a line of capsules forming part of a pharmaceutical process, a system which indicates to within specified limits, that the sample possesses a particular color, is desired for error detection. When the system being monitored is processing a product having a particular color, the equipment may be simply set up to reject any product not possessing this color. Most of the color recognition systems presently available to provide color comparison have been found to either take a considerable amount of time relative to the time needed for monitoring, or involve relatively expensive equipment.

The purpose of this invention is to provide an automated color recognition scheme which is relatively fast and simple and which can determine automatically whether the color of a specimen is sufficiently close to a standard color. The above is achieved by measuring at different spectral bandwidths covering a spectrum, the diffuse spectral reflectance of a sample, and obtaining a cross-correlation coefficient between the standard and specimen reflectance values. A measure of the similarity or identity of a specimen spectral characteristic relative to a standard thus may be obtained.

Although the particular spectrum described is specifically for the visible spectrum and the spectral characteristics measured are in terms of color, the application of the present invention transcends the visible spectrum, and may be used, for example, in the ultra-violet and infra-red spectral domains.

GENERAL DESCRIPTION

The specimen identification methodology practiced in the present invention is accomplished by the performance of at least a two dimensional cross-correlation; however, in the present embodiment a four dimensional cross-correlation is described. The number $n$ of dimensions or components is determined by the number of bandwidth "windows" employed for observing the spectral reflectance characteristics of a specimen. The spectral reflectance measurement obtained for each bandwidth is converted into an electronic signal E. Preselected standard reference values (X) for each of said bandwidths $n$, are then employed and cross-correlated with the measurement values E to provide a cross-correlation coefficient Q.

In the present embodiment the color recognition system develops the signal for E by passing light through four different optical filters onto photodetectors. The standard reference values for components $X_n$ are implemented through setting potentiometers which are used to effectively multiply the voltage output E of the photodetectors. The cross-correlation coefficient between $\overline{X}$ and $\overline{E}$ is given by:

$$Q = \frac{\overline{X} \cdot \overline{E}}{|X| \cdot |E|} = \frac{\Sigma X_n E_n}{[\Sigma X_n^2 \Sigma E_n^2]^{1/2}}$$

In the application of the present invention the selection of the bandwidths is made with several considerations in mind including coverage of the entire spectrum of interest. For example, if color is to be monitored, the entire visible spectrum extending from 400 to 700 nanometers is to be covered. Also, the bandwidths selected overlap and the bandwidth of each filter should be chosen with regard to the response characteristics of the photodetector and the light source to make the photocurrents nearly equal when they are viewing a white specimen.

PREFERRED EMBODIMENT

Figure 1:
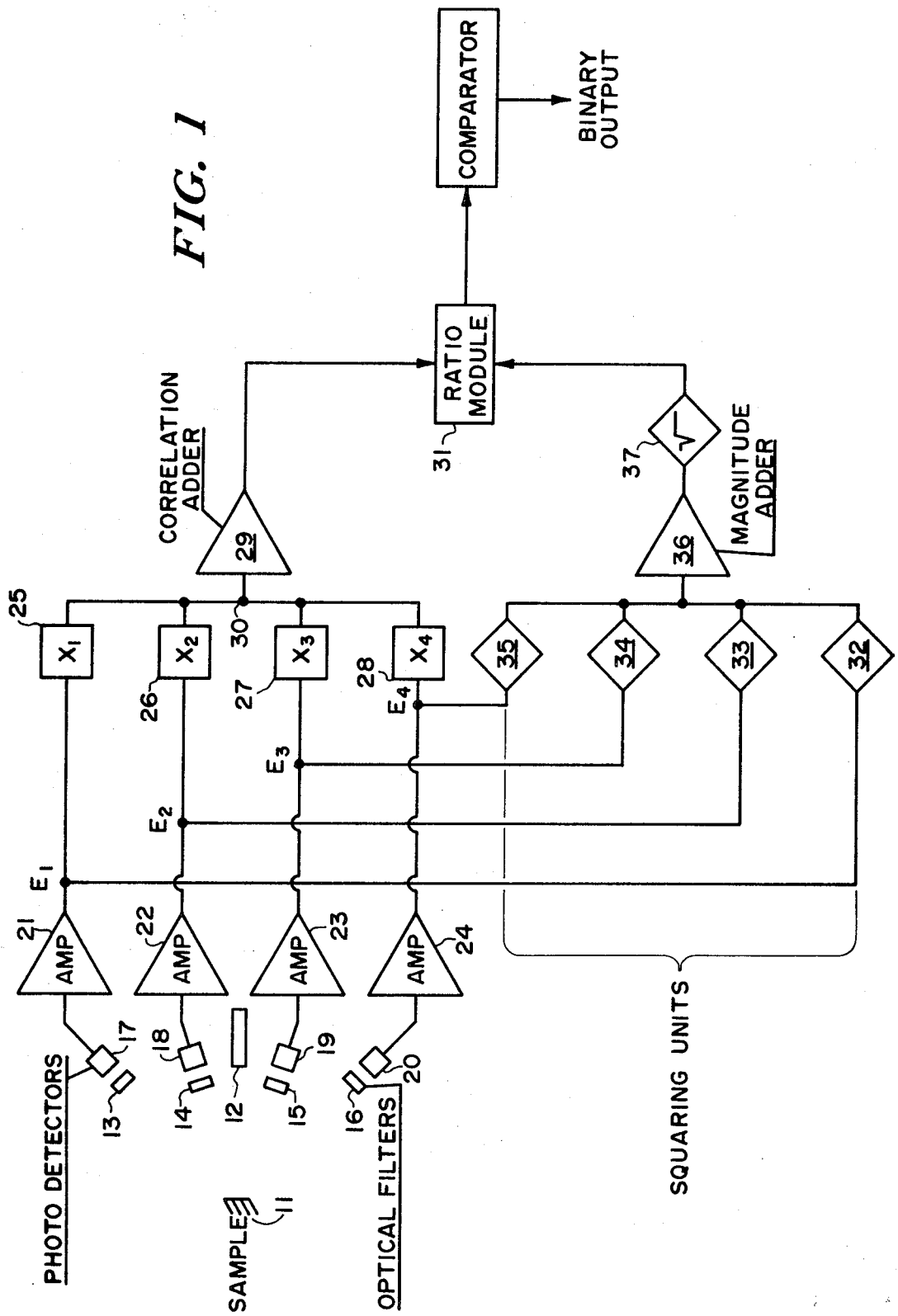
FIG. 1 is a block diagram depicting one preferred embodiment of the present invention.
Figure 2:
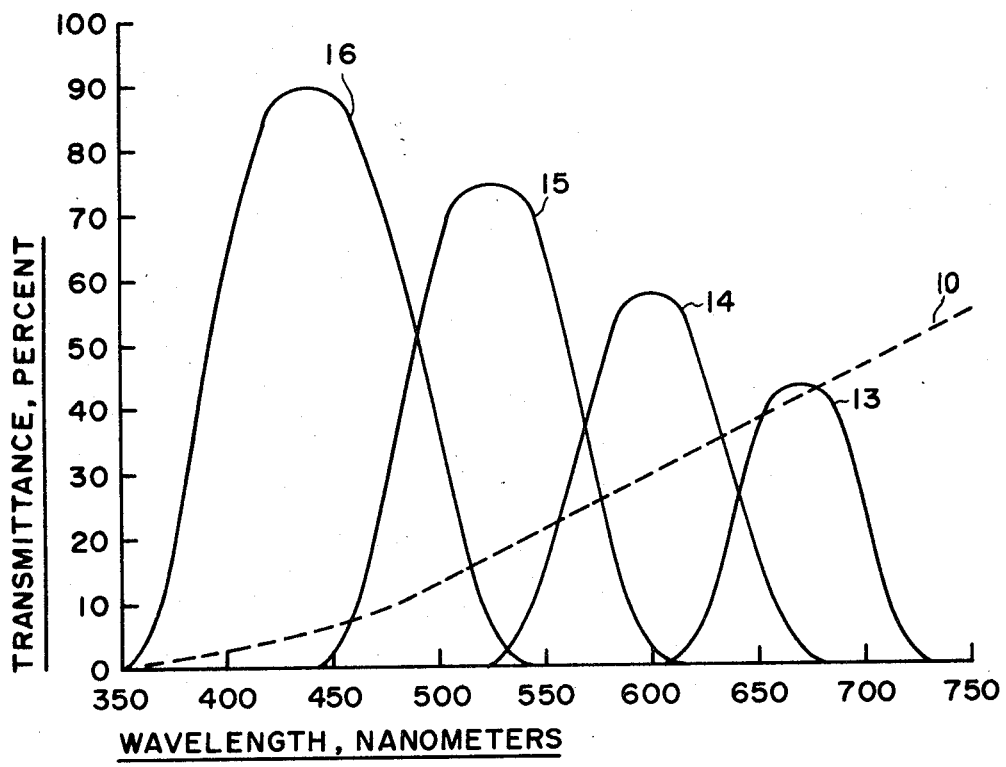
FIG. 2 shows a graph illustrating one set of spectral characteristics of the optical filters, in terms of transmittance percentage versus wavelength.

With reference to FIG. 1, there is generally shown a specimen 11 which is positioned to receive light from a lamp assembly 12 including, for example, a tungsten ribbon lamp, whereby the light might be channeled by a fiber optic light guide to fall on the specimen surface. Four optical filters 13 through 16 are shown to receive the off-specular light, a component of the diffusely reflected light, which might be similarly channeled through four other light guides, one for each of the four filters. Assuming use of four bandwidths, the four optical filters could, for example, have the spectral characteristics illustrated in FIG. 2 where the dashed line 10 represents typical response of the photodetectors to the lamp. The light passing through each of the optical filters is then directed to its respective photodetector 17, 18, 19 and 20 which preferably are low-drift units to minimize the leakage current. The spectral transmitting characteristics at the selected bandwidths must, of course, be such that they allow the photodetectors to reproduce electronic signals of suitable amplitude. The electrical signals produced at each of the photodetectors are then fed through respective amplifiers 21 through 24 enabling the low photodetector currents to be amplified by using, for example, a preamplifier gain adjuster and operational amplifier units (not shown) for achieving the desired gain, to provide a series of output voltages represented as $E_1$, $E_2$, $E_3$, $E_4$ respectively.

Figure 3:
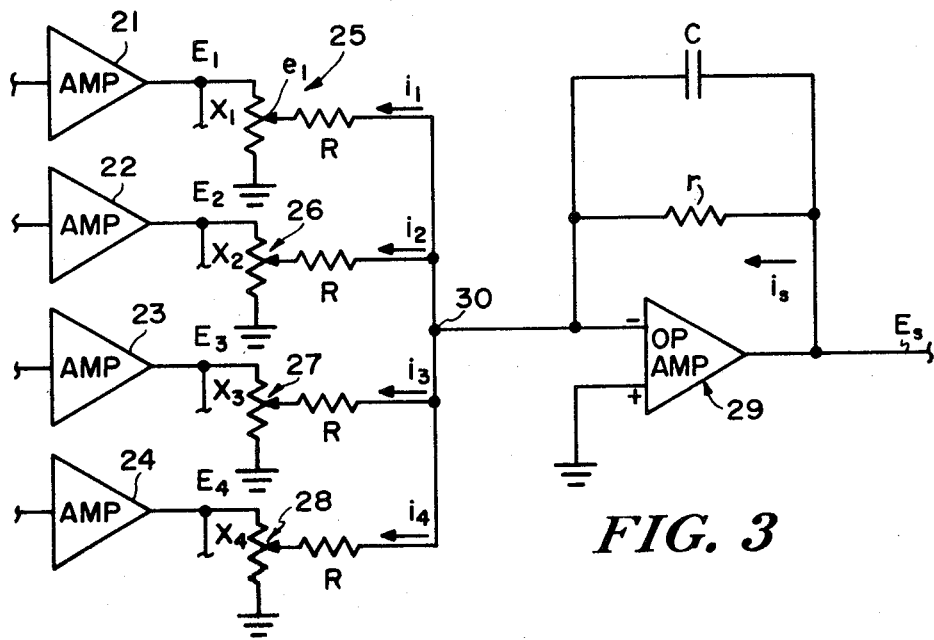
FIG. 3 is a more detailed block diagram of the potentiometer and correlation adder units shown in FIG. 1.

The output signals from amplifiers 21 through 24 are then fed to their respective ones of a series of multiplier units 25 through 28, represented in FIG. 3 as a series of potentiometers each one of which has its own particular resistance setting component value $X_n$ to provide an individual resistance for each selected bandwidth which is utilized as a standard reference value to effectively multiply the voltage output $E_n$ of its respective photodetector.

With reference to FIG. 3, assuming the voltage obtained at the slidewire setting of potentiometer unit 25 is $e_1$ the standard reference value vector component or multiplier factor $X_1$ is formed from the components $$X_1 = e_1/E_1 \text{ or}$$

the ratio of the resistance from the potentiometer slidewire to ground, to the entire resistance of the potentiometer. The current $i_1$ through resistor R will also equal $$i_1 = e_1/R$$

Therefore, $$i_1 = (X_1 E_1)/R$$

With reference back to FIG. 3, an operational amplifier 29 is employed as a correlation adder whereby its output voltage $E_s$ is proportional to the sum of the four input currents $i_1$ through $i_4$. In the operational amplifier unit the current $i_s$ through resistor 4 may be defined as follows:

$$i_s = i_1 + i_2 + i_3 + i_4 = E_s/r, \text{ or}$$

$$(E_s/r) = e_1/R + e_2/R + e_3/R + e_4/R$$

and by making $r$ equal to R, then $$E_s = e_1 + e_2 + e_3 + e_4 = X_1 E_1 + X_2 E_2 + X_3 E_3 + X_4 E_4$$

$$E_s = \Sigma X_n E_n$$

The output $E_s$ of correlation adding unit 29 is then fed into the ratio modular unit 31. With reference to FIG. 1 and to the output leads of amplifiers 21 through 24, each of the leads is also connected to one of the squaring units 32 through 35, which are analog squaring modules having their outputs connected to an operational amplifier unit 36 for adding up the magnitude of voltages $E_1^2$, $E_2^2$, $E_3^2$, $E_4^2$. The output of the operational amplifier adding unit 36 is coupled to a square root circuit 37, the output of which is connected to ratio module 31, and which square root output might be defined as follows:

$$\text{Output} = \sqrt{\Sigma E_n^2}$$

In implementing the $X_n$ component setting to condition the apparatus for discrimination of a particular color, the colored specimen surface is presented to the optical system. The gain control of the input amplification system is then adjusted to give a voltage at the output of each of the amplifiers 21 to 24, about 20 to 30 percent below the amplifier saturation voltage. If the color red were present, for example, the four voltages for a small amplifier saturation voltage (where 5 volts corresponds to a spectral reflectance of 100 percent from a reflecting white object) might be:

$E_1 = 0.5$ volts;
$E_2 = 0.6$ volts;
$E_3 = 1.5$ volts; and,
$E_4 = 4.0$ volts

To determine the $X_n$ for discrimination of the red color, the four potentiometer values are then adjusted until four settings are arrived at which provide a cross-correlation coefficient of one or virtually one. The potentiometer settings also must be all similarly proportional to the output voltages $E_n$. Therefore, if the ratio module 31 to be hereinafter described has an output of 10 volts when its inputs are equal and it is desired that for a correlation coefficient of one that the output of the ratio module be 10 volts, then the magnitude of the vector X must be one. Hence, the settings of the four potentiometers, expressed as fractions of full scale, are positioned so as to satisfy the following:

$$X_1 = E_1/\sqrt{E_1^2 + E_2^2 + E_3^2 + E_4^2} = 0.5/4.34 = 0.115$$

$$X_2 = E_2/\sqrt{E_1^2 + E_2^2 + E_3^2 + E_4^2} = 0.6/4.34 = 0.138$$

and so on, giving $X_3 = 0.345$, $X_4 = 0.923$.

Any color other than the color for which the device is set (red in this instance) would give a reading of less than 10 volts on the output. For example, if dark blue were present, it was found we might have
$E_1 = 2.0$ volts
$E_2 = 1.0$ volts
$E_3 = 0.5$ volt
$E_4 = 0.5$ volt
and the output voltage would be $$E_{out} = [10 (0.115 \times 2.0 + 0.138 \times 1.0 + 0.345 \times 0.5 + 0.923 \times 0.5)]/\sqrt{5.5}$$

$$= 4.21 \text{ volts.}$$

The settings of the potentiometers may also be made according to the relations $$X_1 = E_1/(\text{any value} \geq 5.0)$$

whereby with such latter settings of the potentiometers at a particular set of filters the desired color would give the maximum voltage on the output. Any other color would give a voltage less than this maximum.

At ratio module 31 the sum of the potentiometer outputs or $E_s$ from correlation adder 29 is divided by the output of the square root circuit 37 to give an output defined as follows:

Voltage out = Constant times the cross-correlation coefficient i.e. $Q = (\text{Constant}) \cdot \Sigma X_n E_n / \sqrt{\Sigma E_n^2}$ The correlation circuitry has been preset by use of the standard so that when good correlation exists between the specimen measurement value represented by the vector $\overline{E}$ and the specified standard reference value represented by the vector $\overline{X}$, then the output of the ratio module will provide an output signal which will trigger comparator unit 38. The actual accuracy or relative comparison of standard versus specimen is obtained by adjustment of the comparator to provide a preset value of minimum deviation from a standard color to account for machine error and extremely light variations in color shading. The comparator might also, for example, be a Schmidt trigger to provide an output signal in binary form.

Although in the particular embodiment shown, four different bandpass regions were utilized in applicants' cross-correlation color detection technique, it should be understood, of course, that as few as two bandpass filters and certainly more than four bandpass filters can be employed. Of course, the larger the number of overlapping bandpass filters utilized to cover the visible spectrum, the greater the degree of accuracy which may be obtained.

We claim:

1. Automatic cross-correlation apparatus for identifying a spectrum selected bandwidth characteristics of a specimen product relative to a standard comprising:

means for sensing reflectance values of a specimen product at each of two or more overlapping bandwidths covering the spectrum and for generating separate electrical output signals for each of said bandwidths having a magnitude indicative of each of said reflectance values;

means for forming a signal ratio of a signal ratio numerator to a signal ratio denominator for generating the cross-correlation coefficient between the standard and reference values;

first modifying means having reference values derived from reflectance values of the standard for each of said bandwidths for respectively modifying said output signals with said reference values to generate the signal ratio numerator and to input said numerator to said signal ratio means second modifying means for receiving said separate electrical output signals and for generating a signal ratio denominator for inputting said denominator to said signal ratio means; and means coupled to said ratio forming means for comparing said cross-correlation coefficient with an optimum value representative of the standard.

2. Apparatus according to claim 1 wherein said ratio forming means includes:

ratio means for relating said modified output signals to a nonlinear function of said output signals to provide the cross-correlation coefficient.

3. Apparatus according to claim 2 wherein said first modifying means further includes:

means for summing the respectively modified output signals to provide a first input to said signal ratio numerator.

4. Apparatus according to claim 3 wherein said second modifying means further includes:

means for generating the square root of the summed squares of said output signals to derive said nonlinear function of said output signals as said signal ratio denominator.

5. Apparatus according to claim 4 wherein said first modifying means includes selectively preset impedance means for each bandwidth defining said reference values for multiplying the respective bandwidth output signals.

6. Automatic cross-correlation apparatus for identifying in the visible spectrum selected bandwidth color characteristics of a specimen product relative to a standard comprising:

means for optically determining reflectance values of a specimen product at each of two or more overlapping bandwidths covering the visible spectrum and for producing separate electrical output signals for each of said bandwidths indicative of each of said reflectance values;

first modifying means having an impedance representing a reference value derived from reflectance values of the standard for each of said selected bandwidths, for modifying the respective output signals and summating the same to produce a first output signal;

second modifying means for generating a second output signal representing a nonlinear function of said output signals means for forming a ratio of said first output signals to said second output signals for generating a cross-correlation coefficient between the specimen and standard reference value; and means for comparing the cross-correlation coefficient with a minimum optimum value representative of the standard to measure the variance of the specimen color from the standard color.

7. Apparatus according to claim 6 wherein:

said second modifying means includes means for taking the square root of the summed squares of said output signals.

8. The method of identifying in the visible spectrum the color of a specimen product relative to a standard comprising the steps of:

optically determining reflectance characteristics of a specimen product at each of two or more overlapping bandwidths covering the visible spectrum and generating electrical output signals indicative of the magnitude of said reflectance values;

generating standard reference values derived from reflectance values of the standard for each of the selected bandwidths;

modifying said output signals with their respective reference values and producing a combined first output signal;

modifying said output signals by forming a nonlinear function of said signals for producing a second output signal;

forming a cross-correlation coefficient between the reflectance values of the specimen and the standard reference values by relating the first output signal to the second output signal; and comparing the cross-correlation coefficient with an optimum value representative of the standard to measure the variance of the specimen color from the standard color.

9. Automatic cross-correlation apparatus for identifying in a spectrum selected bandwidth characteristics of a specimen product relative to a standard comprising:

means for sensing transmittance values of a specimen product at each of two or more overlapping bandwidths covering the spectrum and for generating separate electrical output signals for each of said bandwidths having a magnitude indicative of each of said transmittance values;

means for forming a signal ratio of a signal ratio numerator to a signal ratio denominator for generating the cross-correlation coefficient between the standard and reference values;

first modifying means having reference values derived from transmittance values of the standard for each of said bandwidths for respectively modifying said output signals with said reference values to generate the signal ratio numerator and to input said numerator to said signal ratio means;

second modifying means for receiving said separate electrical output signals and for generating the signal ratio denominator for inputting said denominator to said signal ratio means; and means coupled to said ratio forming means for comparing said cross-correlation coefficient with an optimum value representative of the standard.

10. Apparatus according to claim 9 wherein said ratio forming means includes:

ratio means for relating said modified output signals to a nonlinear function of said output signals to provide the cross-correlation coefficient.

11. Apparatus according to claim 10 wherein said first modifying means further includes:

means for summing the respectively modified output signals to provide a first input to said signal ratio numerator.

12. Apparatus according to claim 11 wherein said second modifying means further includes:

means for generating the square root of the summed squares of said output signals to derive said nonlinear function of said output signals as said signal ratio denominator.

13. Apparatus according to claim 12 wherein said first modifying means includes selectively preset impedance means for each bandwidth defining said reference values for multiplying the respective bandwidth output signals.

14. Automatic cross-correlation apparatus for identifying in the visible spectrum selected bandwidth color characteristics of a specimen product relative to a standard comprising:

means for optically determining transmittance values of a specimen product at each of two or more overlapping bandwidths covering the visible spectrum and for producing separate electrical output signals for each of said bandwidths indicative of each of said transmittance values;

first modifying means having an impedance represent a reference value derived from transmittance values of the standard for each of said selected bandwidths, for modifying the respective output signals and summating the same to produce a first output signal;

second modifying means for generating a second output signal representing a nonlinear function of said output signals means for forming a ratio of said first output signals to said second output signals for generating a cross-correlation coefficient between the specimen and standard transmittance value; and means for comparing the cross-correlation coefficient with a minimum optimum value representative of the standard to measure the variance of the specimen color from the standard color.

15. Apparatus according to claim 14 wherein:

said second modifying means includes means for taking the square root of the summed squares of said output signals.

16. The method of identifying in the visible spectrum the color of a specimen product relative to a standard comprising the steps of:

optically determining transmittance characteristics of a specimen product at each of two or more overlapping bandwidths covering the visible spectrum and generating electrical output signals indicative of the magnitude of said transmittance values;

generating standard reference values derived from transmittance values of the standard for each of the selected bandwidths;

modifying said output signals with their respective transmittance values and producing a combined first output signal;

modifying said output signals by forming a nonlinear function of said signals for producing a second output signal;

forming a cross-correlation coefficient between the transmittance values of the specimen and the standard reference values by relating the first output signal to the second output signal; and comparing the cross-correlation coefficient with an optimum value representative of the standard to measure the variance of the specimen color from the standard color.

* * * * *